US012405340B1

(12) United States Patent
Gao et al.

(10) Patent No.: US 12,405,340 B1
(45) Date of Patent: Sep. 2, 2025

(54) DIRECTION-FINDING DEVICE BASED ON COUPLED AND DETUNED SPOOF LOCALIZED SURFACE PLASMONS

(71) Applicant: ZHEJIANG UNIVERSITY, Zhejiang (CN)

(72) Inventors: Fei Gao, Hangzhou (CN); Yumeng Yang, Hangzhou (CN); Hongsheng Chen, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 19/056,637

(22) Filed: Feb. 18, 2025

Related U.S. Application Data

(63) Continuation of application No. PCT/CN2024/080245, filed on Mar. 6, 2024.

(30) Foreign Application Priority Data

Feb. 29, 2024 (CN) .......................... 202410226232.2

(51) Int. Cl.
*G01S 3/781* (2006.01)
*G02B 5/00* (2006.01)

(52) U.S. Cl.
CPC .............. *G01S 3/781* (2013.01); *G02B 5/008* (2013.01)

(58) Field of Classification Search
None
See application file for complete search history.

(56) References Cited

U.S. PATENT DOCUMENTS

2019/0221895 A1* 7/2019 Konopka .............. H02J 7/0069

FOREIGN PATENT DOCUMENTS

| CN | 103280622 A | * 9/2013 | ................ H01P 7/00 |
| CN | 106526337 A | 3/2017 | |
| CN | 111129685 A | 5/2020 | |

(Continued)

OTHER PUBLICATIONS

Liao, Z., Luo, Y., Fernández-Domínguez, A. et al. High-order localized spoof surface plasmon resonances and experimental verifications. Sci Rep 5, 9590 (2015). (Year: 2015).*

(Continued)

*Primary Examiner* — Bernarr E Gregory
(74) *Attorney, Agent, or Firm* — Wiersch Law Group

(57) ABSTRACT

A direction-finding device based on coupled and detuned spoof localized surface plasmons, comprising a dielectric substrate with a metal coating at the bottom and two evenly-grooved metal discs with different sizes or materials. The two grooved metal discs represent two spoof localized surface plasmonic resonators, i.e., SLSP1 and SLSP2, with different resonance frequencies due to their different sizes or materials. SLSP1 and SLSP2 are distributed on the dielectric substrate along the diagonal of the dielectric substrate, with the center of the dielectric substrate as a symmetrical center, to form a coupled and detuned spoof localized surface plasmonic system. In response to the incoming waves from different directions, SLSP1 and SLSP2 support spoof localized surface plasmonic modes with different phase differences. According to the phase difference, the incident angle of the incoming waves can be determined uniquely.

5 Claims, 4 Drawing Sheets

(56) References Cited

FOREIGN PATENT DOCUMENTS

| | | |
|---|---|---|
| CN | 114279478 A | 4/2022 |
| CN | 114965512 A | 8/2022 |

OTHER PUBLICATIONS

A. Pors et al, "Localized Spoof Plasmons Arise while Texturing Closed Surfaces," Phys. Rev. Lett. 108, 223905—Published May 31, 2012 DOI: https://doi.org/10.1103/PhysRevLett.108.223905.(Year: 2012).*
W. Tang et al, "Concept, Theory, Design, and Applications of Spoof Surface Plasma Polaritons at Microwave Frequencies"; published in "Advanced Optical Materials"; 2019, 7, 1800421; DOI: 10.1002/adom.201800421, (Year: 2019).*
International Search Report (PCT/CN2024/080245); Date of Mailing: Aug. 28, 2024(3 pages).

* cited by examiner

DIRECTION-FINDING DEVICE BASED ON COUPLED AND DETUNED SPOOF LOCALIZED SURFACE PLASMONS

CROSS-REFERENCE TO RELATED APPLICATIONS

The present application is a continuation of International Application No. PCT/CN2024/080245, filed on Mar. 6, 2024, which claims priority to Chinese Application No. 202410226232.2, filed on Feb. 29, 2024, the contents of both of which are incorporated herein by reference in their entireties.

TECHNICAL FIELD

The present disclosure relates to the field of wireless direction-finding technology, and in particular, to a direction-finding device based on coupled and detuned spoof localized surface plasmons (SLSPs).

BACKGROUND

Wireless direction-finding technology is to determine the direction of arrival based on the properties of incoming waves, i.e., amplitudes and propagation phases. It has broad application prospects in both civil and military fields, such as wireless communication, transportation, electronic countermeasures, etc. Recently, with the rapid development of radio technology, wireless direction-finding devices show a trend of high performance, easily integrated, device miniaturization and low cost. However, traditional direction-finding devices struggle to meet both the requirements of high detection performance and miniaturization, making it difficult to satisfy the current development requirements of wireless direction-finding technology.

On the other hand, research on localized surface plasmons (LSPs) has attracted widespread attention in the field of sensing. Localized surface plasmon is the collective oscillation of free electrons in conductive nanoparticles at optical frequencies. Attributed to the confined mode profile and near-field enhancement, the localized surface plasmon is highly sensitive to environmental perturbation, showing an exciting application prospect in sensing. The concept and applications of localized surface plasmon have also been extended to spoof localized surface plasmons (SLSPs) in microwave and terahertz frequencies. Spoof localized surface plasmons mimic the dispersion characteristics and confinement properties of localized surface plasmons, which opens the way to the design of compact, miniaturized and high-performance sensors in microwave and terahertz frequencies.

SUMMARY

To overcome the defects of the prior art in the field of wireless direction-finding technology, the present application provides a direction-finding device based on coupled and detuned spoof localized surface plasmons (SLSPs), which meet both the requirements of high performance and device miniaturization.

The present application provides a direction-finding device based on coupled and detuned SLSPs, which consists of two evenly grooved metal discs of different sizes or materials on a dielectric substrate with a metal coating at the bottom.

The two evenly grooved metal discs, represent a first spoof localized surface plasmonic resonator SLSP1 and a second spoof localized surface plasmonic resonator SLSP2 with different resonance frequencies due to their different sizes or materials.

The two SLSP resonators, i.e., SLSP1 and SLSP2, are distributed on the dielectric substrate along the diagonal of the dielectric substrate, with the center of the dielectric substrate as a symmetrical center, to form a coupled and detuned SLSP system.

Further, the different sizes of the two evenly grooved metal discs, specifically, refer to the differences in the outer radius, inner radius, or thickness of the discs. The outer radius denotes the radius of the metal disc, while the inner radius denotes the internal circle radius of the metal disc without grooves.

Further, the material of the two evenly grooved metal discs is selected from copper, gold, silver, etc.

Further, the material of the dielectric substrate is determined according to the permittivity of the material, and the metal coating on the dielectric substrate is copper, gold or silver.

Further, the two SLSP resonators, i.e., SLSP1 and SLSP2, support SLSP modes with different phase differences, in response to the incoming waves from different directions.

Compared to the traditional direction-finding device, the present application meets both the requirements of high detection performance and miniaturization, showing a promising application prospect. Specifically, the present application includes the following beneficial effects:

1. Miniaturization: The direction-finding device utilizes the subwavelength SLSP structure to achieve the miniaturization design, so that the device is compact, compatible and easy to process.
2. Sensitivity: The direction-finding device is designed based on the SLSP structure, which supports SLSP resonance modes. Confined mode profiles and near-field enhancements of the modes make the direction-finding device ultrasensitive to incoming waves, hence improving the direction-finding sensitivity.
3. Accuracy: The direction-finding mechanism is based on the evolution of the phase difference between the two coupled and detuned SLSP resonators as the incident angle of incoming waves changes. The coupling and detuning broaden the phase difference range between the two resonators, which improves the direction-finding accuracy.
4. Adjustable Frequency Band: The operating frequency band of the direction-finding device can be adjusted by changing the structure dimension or dielectric material, providing a flexible and adjustable platform for direction-finding applications in different frequency bands.

It is to be understood that both the foregoing general description and the following detailed description are exemplary and explanatory only and are not intended to limit the present application.

BRIEF DESCRIPTION OF DRAWINGS

The attached figures, which are incorporated in and constitute a part of this specification, serve to explain the principles of the present application together with the description.

DESCRIPTION OF EMBODIMENTS

Reference will now be made in detail to exemplary embodiments, examples of which are illustrated in the accompanying drawings. When the following description refers to the drawings, unless otherwise indicated, the same numbers in different drawings indicate the same or similar elements. The embodiments described in the following exemplary embodiments do not represent all embodiments consistent with the present disclosure. Rather, they are merely examples of devices and methods consistent with some aspects of the present disclosure as detailed in the appended claims.

The terminology used in the present disclosure is to describe specific embodiments only and is not intended to limit the present disclosure. The singular forms "a", "said" and "the" used in the present disclosure and the appended claims are also intended to include the plural forms, unless the context clearly indicates other meaning. It should also be understood that the term "and/or" as used herein refers to and includes any or all possible combinations of one or more associated listed items.

Figure 1:
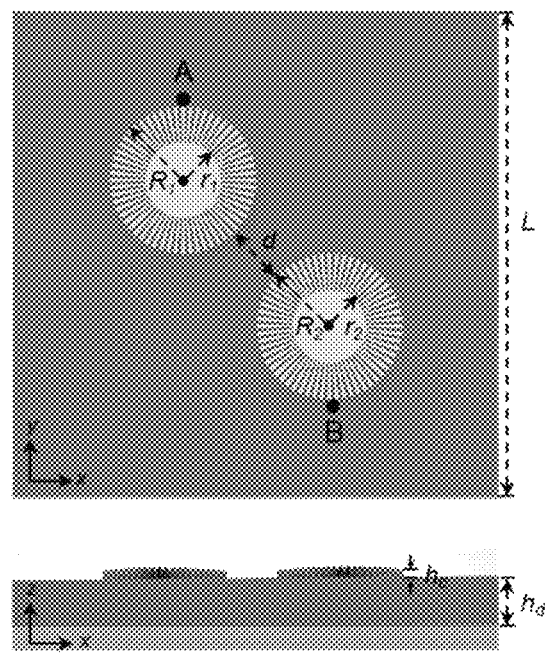
FIG. 1 is a schematic view of the direction-finding device structure based on coupled and detuned spoof localized surface plasmonic resonators according to an exemplary embodiment.

The present disclosure provides a direction-finding device based on coupled and detuned spoof localized surface plasmons (SLSPs). As shown in FIG. 1, the direction-finding device is composed of two evenly grooved metal discs of different sizes or materials on the dielectric substrate with a metal coating at the bottom. The two evenly grooved metal discs, represent a first spoof localized surface plasmonic resonator SLSP1 and a second spoof localized surface plasmonic resonator SLSP2 with different resonance frequencies due to their different sizes or materials. The two SLSP resonators, i.e., SLSP1 and SLSP2, are distributed on the dielectric substrate along the diagonal of the dielectric substrate, with the center of the dielectric substrate as a symmetrical center, to form a coupled and detuned SLSP system.

It should be noted that the different sizes of the two evenly grooved metal discs, specifically, refer to the differences in the outer radius, inner radius, or thickness of the discs, The outer radius denotes the radius of the metal disc, while the inner radius denotes the internal-circle radius of the metal disc without grooves.

The following discussion will focus on an embodiment of the direction-finding device operating at 3.67 GHz.

In the embodiment, the two metal discs are evenly grooved from the edge of the discs, with inner radii of $r_1$ and $r_2$, outer radii of $R_1$ and $R_2$, and thicknesses of $h_{c1}$ and $h_{c2}$, respectively. The number of grooves of a metal disc is N, and the duty ratio of the groove width to groove cycle is A. It should be noted that the material of the metal discs can be copper, gold, silver, etc, and two metal discs can be made of different materials. The nearest distance from edge to edge of the two metal discs is d. The material of the dielectric substrate is determined according to the permittivity parameter, such as Polytetrafluoroethylene (PTFE) F4BTMS220. The material permittivity of the dielectric substrate is e, while the length and thickness of the substrate are L and $h_d$, respectively. The metal coating at the bottom of the dielectric substrate can be copper, gold, silver, etc, and the thickness of the metal coating is $h_b$. In the embodiment, the above materials and parameters can be appropriately adjusted according to the application requirements. Also, it is necessary to ensure the structure of the metal discs on the dielectric substrate still supports the SLSP resonance modes after adjustment.

In this embodiment, for the direction-finding device operating at 3.67 GHz, the two metal discs are all made of copper, the number of grooves is N=60, and the duty ratio is A=50% (i.e., groove width:non-groove width=1:1). The outer radii of SLSP1 and SLSP2 are $R_1=R_2=R=12$ mm, and thicknesses are $h_{c1}=h_{c2}=h_c=0.0175$ mm. The inner radii of SLSP1 and SLSP2 are $r_1=6$ mm and $r_2=6.2$ mm, respectively, hence there is a resonance frequency detuning between the two SLSPs. And the distance between the two SLSPs is d=10 mm. The material of the dielectric substrate is PTFE F4BTMS220, with a permittivity ε=2.2, and the substrate is coated with copper. The length and thickness of the dielectric substrate are L=80 mm and $h_d$=2 mm, and the thickness of the copper coating at the bottom is $h_b$=0.0175 mm.

Figure 2:
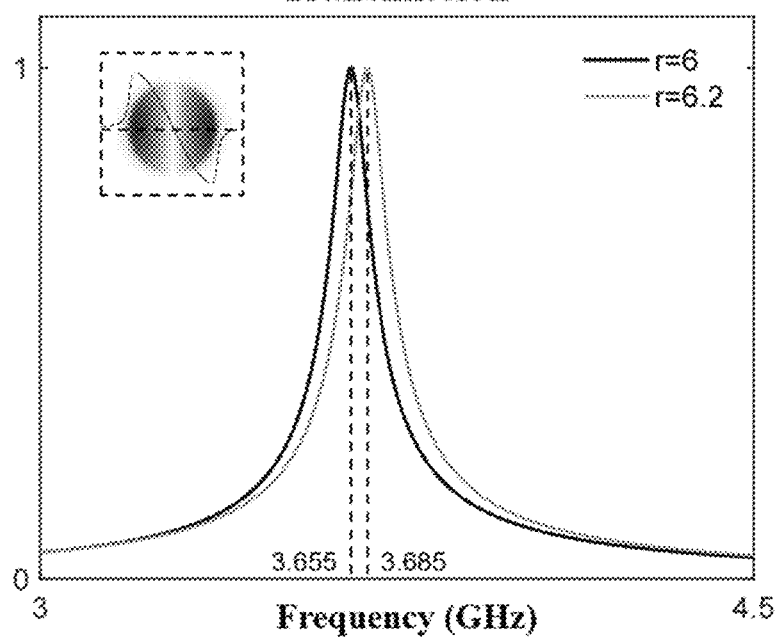
FIG. 2 is a transmission spectrum diagram and dipole-mode profile supported by a spoof localized surface plasmon according to an exemplary embodiment.

FIG. 2 shows the transmission spectra and dipole-mode profile supported by SLSP1 and SLSP2. From the spectra of FIG. 2, the resonance peaks of the SLSP1 and SLSP2 with internal radii of 6 mm and 6.2 mm are $\omega_1$=3.655 GHz and $\omega_2$=3.685 GHz, respectively, existing a frequency detuning δ=0.03 GHz. The central resonance frequency of the SLSP1 and SLSP2 is $\omega_0=(\omega_1+\omega_2)/2$=3.67 GHz. Both two spoof surface plasmonic resonators support the dipole mode at resonance peaks.

Figure 3:
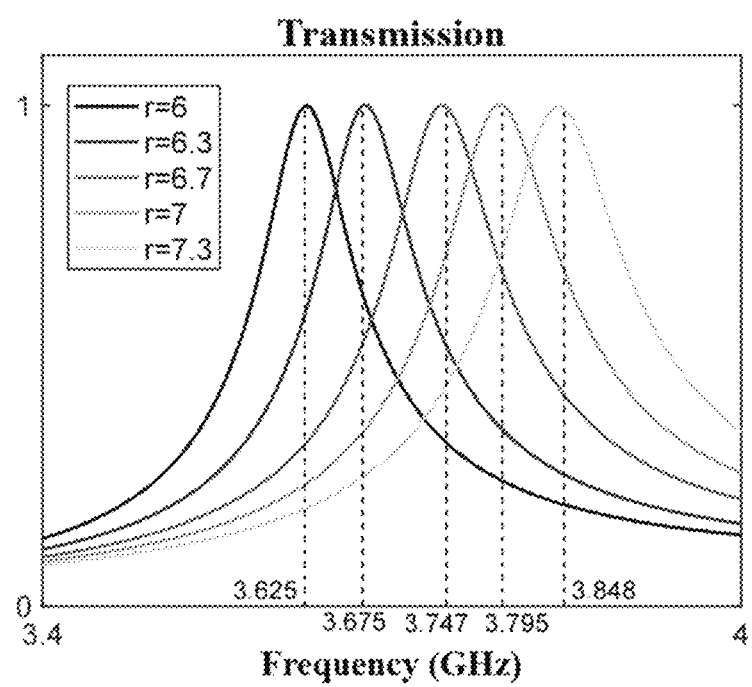
FIG. 3 is a spectral evolution of spoof localized surface plasmonic resonators with different inner radii according to an exemplary embodiment.

It should be noted that for incident waves of other frequencies, we can design the parameters of the two SLSP resonators, such as the inner radii, the outer radii, the thickness or the material of the substrate, to adjust the central resonance frequency $\omega_0$ to be consistent with the frequency of the incident waves. It provides a platform for direction-finding applications in different frequency bands. Taking the inner radius r as an example, FIG. 3 shows the spectral evolution of the SLSP resonator with different inner radii, which demonstrates that the resonance frequency of the SLSP resonator can be adjusted as the inner radius changes.

Figure 4:
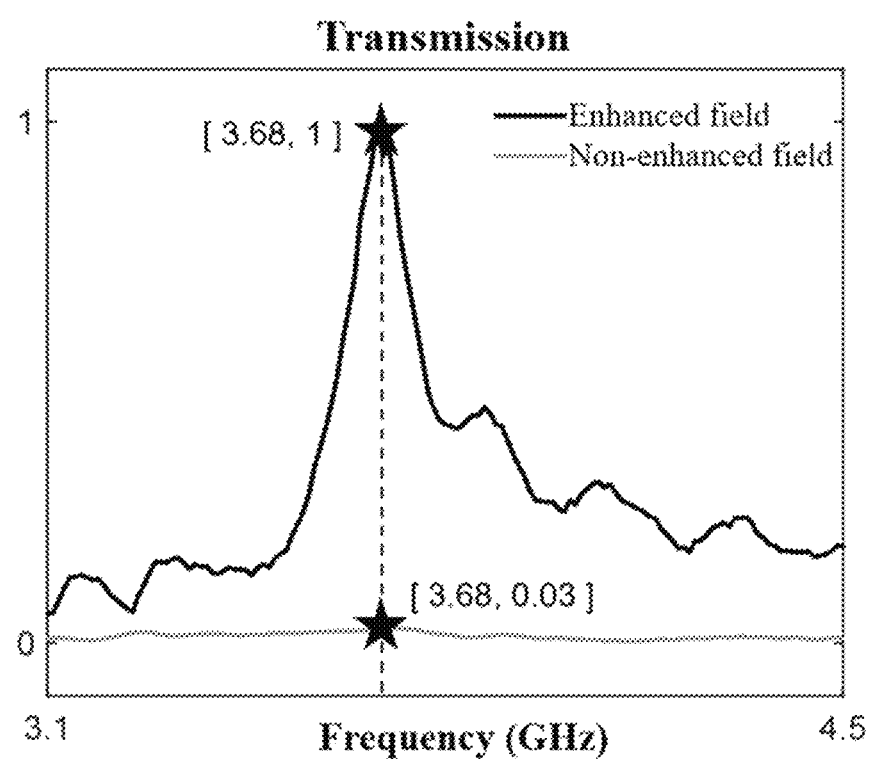
FIG. 4 is a comparison of the spectral intensities before and after utilizing spoof localized surface plasmonic resonators according to an exemplary embodiment.

As shown in FIG. 4, under the far-field incident waves from a horn antenna, the detected field intensity of the SLSP resonator is enhanced by about 33 times compared with that without SLSP resonators, thus greatly improving the direction-finding sensitivity.

Figure 5:
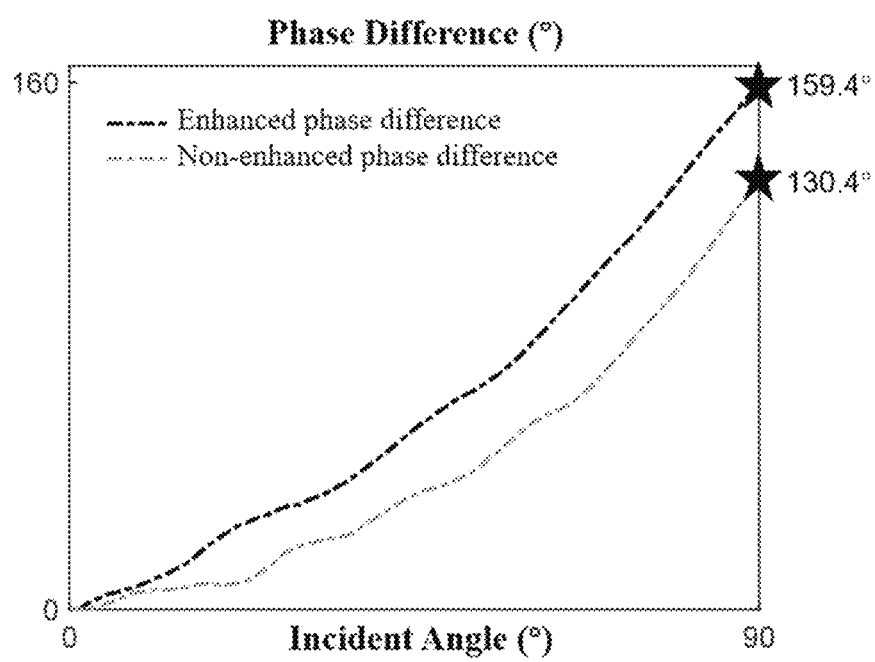
FIG. 5 shows a monotonically increasing relationship between the measured phase difference of the spoof localized surface plasmons and the incident angle of the incoming waves, according to an exemplary embodiment.

FIG. 5 shows the evolution of the phase difference between the SLSP1 and SLSP2 as the incident angle of incoming waves changes, for the direction-finding device with coupled and independent SLSP resonators, respectively. From FIG. 5, the phase differences increase monotonically with the incident angles. Compared with the direction-finding device with independent SLSP resonators, the detected phase difference of the direction-finding device with detuned and coupled SLSP resonators is obviously broadened, i.e., from 0° to 159.4°. Therefore, it realizes the full-range direction finding with the incident angle of 0° 90°, and further improves the direction-finding sensitivity and accuracy.

When in use, the direction-finding device is fixed first, and two identical probes are arranged at positions A and B (as shown in FIG. 1), which are connected to the signal processing circuit. Under the illumination of the incident waves, the two probes detect the electric fields of the two resonators at positions A and B as input to the signal processing circuit to calculate the phase difference. When incoming waves are incident from different directions, the phase difference between the two SLSP resonators evolves. Therefore, according to the phase difference, the incident angle of the incoming waves can be determined.

It should be noted that the present disclosure is not limited to the specific structure described above and shown in the drawings, which means that appropriate modifications can be made based on the direction-finding mechanism stated above.

What is claimed is:

1. A direction-finding device based on coupled and detuned spoof localized surface plasmons, comprising:
    a dielectric substrate with a metal coating at a bottom;
    two evenly-grooved metal discs with different sizes or materials, representing a first spoof localized surface plasmonic resonator SLSP1 and a second spoof localized surface plasmonic resonator SLSP2 that have different resonance frequencies,
    wherein the first spoof localized surface plasmonic resonator SLSP1 and the second spoof localized surface plasmonic resonator SLSP2, are distributed on the dielectric substrate along a diagonal of the dielectric substrate, with a center of the dielectric substrate as a symmetrical center, to form a coupled and detuned spoof localized surface plasmonic system;
    a first probe and a second probe respectively provided adjacent to the first spoof localized surface plasmonic resonator SLSP1 and the second spoof localized surface plasmonic resonator SLSP2, and configured to detect electric fields of the first spoof localized surface plasmonic resonator SLSP1 and the second spoof localized surface plasmonic resonator SLSP2; and
    a signal processing circuit connected to the first probe and the second probe and configured to obtain an electric-field phase difference between the first spoof localized surface plasmonic resonator SLSP1 and the second spoof localized surface plasmonic resonator SLSP2 under an illumination of an incident wave; and determine directions of incoming waves based on a monotonous correspondence between the electric-field phase difference and an incident angle of the incoming waves.

2. The direction-finding device according to claim 1, wherein the two evenly-grooved metal discs with different sizes, refer to differences in an outer radius, an inner radius, or a thickness of the evenly-grooved metal discs, and the outer radius denotes a radius of each of the evenly-grooved metal discs, while the inner radius denotes an internal-circle radius of each of the evenly-grooved metal discs without grooves.

3. The direction-finding device according to claim 1, wherein a material of the evenly-grooved metal disc is selected from a group consisting of copper, gold, and silver.

4. The direction-finding device according to claim 1, wherein a material of the dielectric substrate is determined according to a permittivity parameter, enabling a structure of the evenly-grooved metal discs on the dielectric substrate to support spoof localized surface plasmonic resonance mode, and the metal coating at the bottom of the dielectric substrate is copper, gold, or silver.

5. The direction-finding device according to claim 1, wherein the first spoof localized surface plasmonic resonator SLSP1 and the second spoof localized surface plasmonic resonator SLSP2 support spoof localized surface plasmonic modes with different phase differences, in response to the incoming waves from different directions.

* * * * *